US010906207B2

(12) United States Patent
Mathieu et al.

(10) Patent No.: US 10,906,207 B2
(45) Date of Patent: Feb. 2, 2021

(54) METHOD OF GRINDING POLY(ARYL ETHER KETONES)

(71) Applicant: Arkema France, Colombes (FR)

(72) Inventors: Cyrille Mathieu, Rouen (FR); Karine Huraux, Bourgtheroulde-Infreville (FR)

(73) Assignee: ARKEMA FRANCE, Colombes (FR)

( * ) Notice: Subject to any disclaimer, the term of this patent is extended or adjusted under 35 U.S.C. 154(b) by 84 days.

(21) Appl. No.: 14/357,430

(22) PCT Filed: Nov. 6, 2012

(86) PCT No.: PCT/FR2012/052557
§ 371 (c)(1),
(2) Date: May 9, 2014

(87) PCT Pub. No.: WO2013/068686
PCT Pub. Date: May 16, 2013

(65) Prior Publication Data
US 2014/0322441 A1    Oct. 30, 2014

(30) Foreign Application Priority Data

Nov. 10, 2011    (FR) ..................................... 11 60258

(51) Int. Cl.
| | |
|---|---|
| B29B 13/00 | (2006.01) |
| B29C 64/153 | (2017.01) |
| B02C 19/06 | (2006.01) |
| B29B 13/10 | (2006.01) |
| C08J 3/12 | (2006.01) |

(52) U.S. Cl.
CPC .............. B29B 13/10 (2013.01); B02C 19/06 (2013.01); B29C 64/153 (2017.08); C08J 3/12 (2013.01); *C08J 2371/10* (2013.01); *Y10T 428/2982* (2015.01)

(58) Field of Classification Search
CPC ..... B29B 13/10; B29B 2009/125; B29B 9/02; B29K 2071/00; B33Y 70/00; B02C 13/14–18; B29C 64/153; C08J 3/12; C08J 2371/10
USPC ...................................................... 241/24.28
See application file for complete search history.

(56) References Cited

U.S. PATENT DOCUMENTS

| | | | | |
|---|---|---|---|---|
| 5,100,605 | A * | 3/1992 | Bartlet .................... | B29B 13/10 264/143 |
| 5,247,052 | A | 9/1993 | Lücke et al. | |
| 5,817,206 | A * | 10/1998 | McAlea ................... | C08J 3/122 156/272.8 |
| 5,841,037 | A * | 11/1998 | Ulfik ....................... | B02C 19/06 73/863 |
| 2005/0207931 | A1 | 9/2005 | Hesse et al. | |
| 2006/0134419 | A1 | 6/2006 | Monsheimer et al. | |
| 2008/0245913 | A1 * | 10/2008 | Waznys ................... | B02C 13/14 241/188.1 |
| 2009/0280263 | A1 | 11/2009 | Richter et al. | |
| 2014/0322441 | A1 | 10/2014 | Mathieu et al. | |

FOREIGN PATENT DOCUMENTS

| | | |
|---|---|---|
| CA | 2 086 780 A1 | 7/1993 |
| EP | 1674497 A1 | 6/2006 |
| FR | 2982519 A1 | 5/2013 |

OTHER PUBLICATIONS

Furchner, Bodo, "Fine Grinding with Impact Mills", Chemical Engineering, Aug. 1, 2009, available on-line at http://www.chemengonline.com/fine-grinding-with-impact-mills/, 15 pages (Year: 2009).*
Reilly, J.J., and I.L. Kamal, "The Influence of Particle Properties on the Room Temperature Compaction of Polyether-etherketone (PEEK) Powders", Navy Exploratory Development Program, Apr. 1988 (Year: 1988).*
Evonik Industries, "VESTAKEEP® 1000P Product Information", Oct. 2011, available on-line at https://industrial.vestakeep.com/product/peek-industrial/en/pages/product-information.aspx (Year: 2011).*
International Search Report for Application No. PCT/FR2012/052557 Completed Mar. 1, 2013 and dated Mar. 8, 2013.
NEA News Edition No. 17, 2 Pages.
"Impact Classifier Mill for Fine Grinding"NEA Impact Classifier Mill , Mar. 29, 2019, 10 Pages.
"AFG Fluidised Bed Opposed Jet Mill" Hosokawa AFG Mill, Mar. 29, 2019, 8 Pages.
Furchehner, B. et al"Fine Grinding with Impact Mills" Chemical Enginering, downloaded May 7, 2020, 19 Pages.
Erklarung, 1 Page.
Produktbroschure VESTAKEEP PEEK—Polyetheretherketon-Pulver, EVONIK, 16 Pages.
Produktinformation VESTAKEEP PEEK 2000FP, 2 Pages.
Produktinformation VESTAKEEP PEEK 4000FP, 2 Pages.
Notification of Opposition issued by the European Patent Office dated May 29, 2020, in European Patent Application EP 12794442.9-1017/2776224, (Arkema France), (45 pages).
Notification of Opposition issued by the European Patent Office dated Jun. 15, 2020, in European Patent Application EP112794442.9-1017/2776224, (Arkema France), (27 pages).
"Response to Opposition Briefs," submitted in Opposition proceedings for EP 2 776 224 B1, Nov. 2, 2020, Including (machine generated) English translation, 37 pages.

* cited by examiner

*Primary Examiner* — Alex B Efta
(74) *Attorney, Agent, or Firm* — Buchanan Ingersoll & Rooney P.C.

(57) ABSTRACT

The present invention relates to an improved method of grinding polyaryletherketones, providing very good yields and the production of powders of polyaryletherketones with an average diameter below 100 µm having a narrow size distribution with few fine particles (Dv10>15 µm).

24 Claims, No Drawings

METHOD OF GRINDING POLY(ARYL ETHER KETONES)

CROSS-REFERENCE TO RELATED APPLICATIONS

This is a U.S. National Phase application of International application number PCT/FR2012/052557, filed Nov. 6, 2012, which claims priority benefit of French Application No. 1160258, filed Nov. 10, 2011, both of which are incorporated herein by reference in their entirety for all purposes.

FIELD OF THE INVENTION

The present invention relates to an improved method of grinding polyaryletherketones, providing very good yields and the production of powders of polyaryletherketones with average diameter below 100 μm having a narrow size distribution.

DISCUSSION OF THE RELATED ART

The polyaryletherketones are materials with high performance, notably in terms of thermal stability, and their use in the coating of engineering components is desirable in many applications. The methods of coating with this type of polymer generally use the polymer in the form of powder.

Moreover, component manufacturing techniques of the laser sintering type also use powders.

Methods are therefore required for producing powders, notably in economically viable conditions.

There are numerous methods for grinding polymers. We may in particular mention the equipment used, such as ball mills, impact grinding mills using various types of impactor (hammers, needles, discs), air jet mills, and the operating conditions, typically cryogenic or atmospheric. These methods lead to variable yields and particle sizes sometimes necessitating selection, for example by sieving, of the powder obtained even if a selector is often integrated in the grinding mill, which only allows particles that have been ground sufficiently to pass through. Moreover, these methods result in powders containing a large amount of fine particles that are detrimental to certain applications such as laser sintering.

The grinding of powders of polyaryletherketones is described extensively in the literature.

U.S. Pat. No. 5,247,052 describes a method of grinding of polyaryletherketones with a fluid-bed opposed air jet.

This method is carried out at very cold temperatures and therefore requires the supply of cooling power, at substantial cost.

US20050207931 describes several methods for obtaining powder, including grinding. Once again, grinding is carried out at low temperature.

US20090280263 describes a method for obtaining powder of polyaryletherketones by grinding using polyaryletherketones having an apparent specific surface area measured by BET above 1 m²/g.

In this method, cooling of the polyaryletherketones to be ground is also preferred. In the examples, cooling is effected with liquid nitrogen, i.e. conditions that are disadvantageous for the manufacturing costs. Moreover, in this invention it is necessary to sieve the powder after grinding, which is not the case in the present invention.

Moreover, these methods lead to large amounts of fines, which poses a problem, notably in laser sintering applications.

The applicant found, against all expectations, that the methods of grinding of polyaryletherketones could be carried out at ambient temperature, typically above 0° C. with yields close to 100% to obtain powders having a particle size distribution (diameters by volume) of d10>15 μm, 50<d50<70 μm, 120<d90<180 μm, without additional sieving. A d10>15 μm is considered necessary in the context of fine particles in applications such as laser sintering.

SUMMARY OF THE INVENTION

The present invention relates to a method of grinding of polyaryletherketones of apparent density below 0.9 carried out in a temperature range between 0° C. and the glass transition temperature of the polymer measured by DSC.

DETAILED DESCRIPTION

The polyaryletherketones, also called PAEK, used in the invention comprise units with the following formulae:

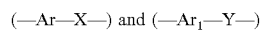

in which:

Ar and $Ar_1$ each denote a divalent aromatic radical;

Ar and $Ar_1$ can preferably be selected from 1,3-phenylene, 1,4-phenylene, 4,4'-biphenylene, 1,4-naphthylene, 1,5-naphthylene and 2,6-naphthylene;

X denotes an electron-accepting group; it can preferably be selected from the carbonyl group and the sulphonyl group, Y denotes a group selected from an oxygen atom, a sulphur atom, an alkylene group, such as —$CH_2$— and isopropylidene.

In these units, at least 50%, preferably at least 70% and more particularly at least 80% of the groups X are a carbonyl group, and at least 50%, preferably at least 70% and more particularly at least 80% of the groups Y represent an oxygen atom.

According to a preferred embodiment, 100% of the groups X denote a carbonyl group and 100% of the groups Y represent an oxygen atom.

More preferably, the polyaryletherketone (PAEK) can be selected from:

a polyetheretherketone also called PEEK comprising units of formula I:

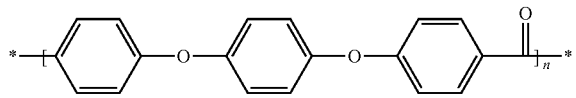

Formula I a polyetherketone, also called PEK, comprising units of formula II:

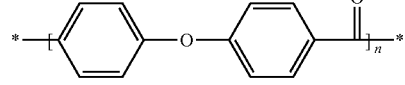

Formula II a polyetherketoneketone also called PEKK, comprising units of formula IIIA, of formula IIIB and a mixture thereof:

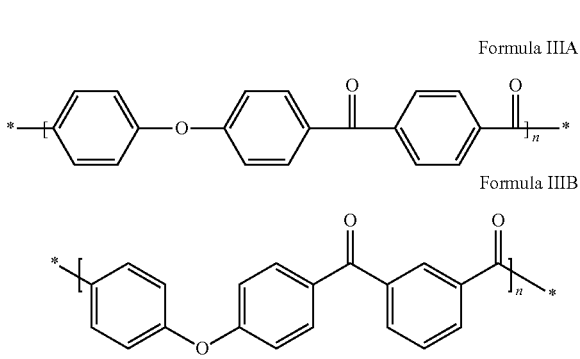

Formula IIIA

Formula IIIB and a polyetheretherketoneketone also called PEEKK, comprising units of formula IV:

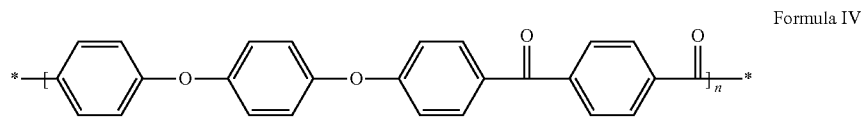

Formula IV but other arrangements of the carbonyl group and of the oxygen atom are also possible.

The polyaryletherketone usable according to the invention can be crystalline, semi-crystalline or amorphous.

Preferably, the polyaryletherketones used are polyetherketoneketones also called PEKK, comprising units of formula IIIA, of formula IIIB and a mixture thereof.

The polyaryletherketones used in the method of the invention can be in the form of porous or non-porous granules, porous or non-porous scales with average size between 0.5 and 5 mm, and porous or non-porous coarse powders.

Preferably, the polyaryletherketones used in the method are in the form of scales or coarse powders and have a porosity above 2 m²/g measured with a Coulter SA3100 from the company Beckman Coulter (measurement by adsorption of nitrogen at 105° C. according to the BET method) and an apparent density below 0.9 kg/l, preferably below 0.4 kg/l, and even more preferably below 0.25 kg/l (density of tamped scales measured on a STAV 2003 jolting volumeter equipped with a 250 ml test specimen after 2500 impulses).

The grinding mills used in the method of the invention can be of any type, but preferably they are impact grinding mills, in which the impactors can be hammers, needles, or discs. According to a second embodiment of the invention the grinding mills used are of the air jet type.

With the aim of optimizing the grinding process, a combination of different types of grinding mills can be used, for example grinding can be carried out first with an impact mill, and then the product is transferred to an air jet mill.

In all cases, the grinding temperature is between 0° C. and the glass transition temperature of the polymer measured by DSC, preferably between 0 and 50° C., even more preferably between 10 and 30° C.

With the method of the invention, it is possible to obtain directly, without subsequent selection of the powder leaving the mill, powders having particle size distributions suitable for application by laser sintering or for coating of articles (d10>15 μm, 50<d50<80 μm, 120<d90<180 μm), with a yield approaching 100%.

The powders obtained are advantageously used in processes for coating articles or laser sintering processes.

The powders can have additions of fillers such as alumina $Al_2O_3$ or silica such as Aerosil to facilitate their flow.

EXAMPLE 1

A polymer in the form of scales of PEKK (OXPEKK SP), of viscosity 0.95 dl/g (viscosity in solution at 25° C. in 96% sulphuric acid according to standard ISO 307) is micronized in a Neuman ICM 7.6 impact grinder-selector at a temperature of 25° C., grinding mill speed 12 000 rev/min, selector speed 4500 rev/min. Three successive grindings give the following granulometry measured on the Insitec T granulometer from Malvern with a focal length of 300 mm (measurement by laser diffraction on dry powder, diameters expressed by volume Dv):

Dv10=27 μm, Dv50=76 μm, Dv90=180 μm.

The yield is 99%.

EXAMPLE 2

A polymer in the form of scales of PEKK (OXPEKK SP), of viscosity 0.85 dl/g (viscosity in solution at 25° C. in 96% sulphuric acid according to standard ISO 307) is micronized in a Neuman ICM 7.6 impact grinder-selector at a temperature of 25° C., grinding mill speed 12 000 rev/min, selector speed 4500 rev/min. Two successive grindings give the following granulometry measured on the Insitec T granulometer from Malvern with a focal length of 300 mm (measurement by laser diffraction on dry powder, diameters expressed by volume Dv):

Dv10=29 μm, Dv50=81 μm, Dv90=184 μm.

The yield is 98%.

EXAMPLE 3

Comparative

A polymer in the form of scales of PEKK (OXPEKK SP), of viscosity 0.87 dl/g (viscosity in solution at 25° C. in 96% sulphuric acid according to standard ISO 307) is micronized in a Mikropull 2DH hammer mill equipped with a grating with round holes of 500 μm at a temperature of −40° C. Grinding gives the following granulometry measured on the Insitec T granulometer from Malvern with a focal length of 300 mm (measurement by laser diffraction on dry powder, diameters expressed by volume Dv):

Dv10=64 μm, Dv50=155 μm, Dv90=322 μm.

Sieving at 145 μm on a Finex 22 sieve made by Russel gives the following granulometry:

Dv10=47 μm, Dv50=95 μm, Dv90=148 μm at a yield of 48%.

It can be seen that at low temperature, the yield is far lower than was obtained by grinding the scales at 25° C.

The invention claimed is:

1. A method of obtaining a powder of a polyaryletherketone, comprising carrying out grinding of a polyaryletherketone of tapped apparent density, measured on a STAV 2003 jolting volumeter equipped with a 250 ml test specimen after 2500 impulses, below 0.4 kg/l to a powder, wherein the grinding is carried out in a temperature range between 0° C. and 50° C., with a yield of at least 98%, whereby the powder obtained from said grinding has a particle size distribution (diameters by volume) of d10>15 µm, 50<d50<80 µm, 120<d90<180 µm.

2. The method according to claim 1 in which the polyaryletherketone is a polyetherketoneketone.

3. The method according to claim 1, wherein an impact mill is used for grinding.

4. The method according to claim 1, wherein an air jet mill is used for grinding.

5. The method according to claim 1, wherein a combination of impact mill and air jet mill is used for grinding.

6. The method according to claim 1, wherein grinding is carried out first with an impact mill and then with an air jet mill.

7. The method according to claim 1, wherein grinding is carried out at a temperature of between 10° C. and 30° C.

8. The method according to claim 1, comprising an additional step of adding a filler to the powder.

9. A method for coating an article, comprising coating the article with a powder obtained in accordance with claim 1.

10. A method for manufacturing a component, comprising laser sintering a powder obtained in accordance with claim 1.

11. The powder obtained by the method according to claim 1.

12. The method according to claim 1, wherein the polyaryletherketone comprises units represented by the formula (—Ar—X—) and (—Ar$_1$—Y—), wherein
Ar and Ar$_1$ each represent a divalent aromatic radical;
X represents an electron accepting group; and
Y represents an oxygen atom, a sulphur atom or an alkylene group.

13. The method according to claim 1, wherein the polyaryletherketone is PEEK.

14. The method according to claim 1, wherein the polyaryletherketone is PEK.

15. The method according to claim 1, wherein the polyaryletherketone comprises PEKK.

16. The method according to claim 1, wherein the polyaryletherketone is PEEKK.

17. The method according to claim 1, wherein the polyaryletherketone is not subjected to sieving.

18. The method according to claim 1, wherein the polyaryletherketone has an apparent density below 0.25 kg/l.

19. The method according to claim 1, wherein the polyaryletherketone has a porosity above 2 m2/g, measured by adsorption of nitrogen at 105° C.

20. The method according to claim 1, comprising a selection which only allows particles that have been ground sufficiently to pass through, wherein the yield of obtained powder approaches 100%.

21. The method according to claim 1, wherein the polyaryletherketone used in the method is in the form of scales or powders.

22. The method according to claim 1, which is accomplished without additional sieving and with a yield of at least 98%.

23. A method of obtaining a powder of a polyaryletherketone, comprising carrying out grinding of a polyaryletherketone of tapped apparent density, measured on a STAV 2003 jolting volumeter equipped with a 250 ml test specimen after 2500 impulses, below 0.4 kg/l to a powder, wherein the grinding is carried out in a temperature range between 0° C. and 50° C., with a yield of at least 98%, whereby the powder obtained from said grinding has a particle size distribution (diameters by volume) of d10>15 µm and 50<d50<80 µm.

24. The method according to claim 23, whereby the powder obtained from said grinding has a particle size distribution (diameters by volume) of d90<180 µm.

* * * * *